United States Patent [19]
Musow

[11] Patent Number: 5,757,660
[45] Date of Patent: May 26, 1998

[54] SCRUBBER CONTROL SYSTEM AND METHOD

[75] Inventor: Wolf Musow, Plmouth, Mass.

[73] Assignee: The Foxboro Company, Foxboro, Mass.

[21] Appl. No.: 622,221

[22] Filed: Mar. 27, 1996

[51] Int. Cl.⁶ .................. C05D 21/00; B01D 53/34
[52] U.S. Cl. .................. 364/500; 364/550; 364/221.4;
 364/222.1; 422/4; 422/5; 422/62; 422/105;
 422/108; 422/168; 423/210; 423/224; 423/238;
 423/243.01; 210/739; 210/743; 210/746;
 210/198.1; 95/3; 95/8; 95/13; 95/16
[58] Field of Search .................. 364/500, 550,
 364/569, 221.9, 222.1; 15/319, 320, 353,
 415.1; 137/1, 5, 238, 544; 4263/210, 224,
 238, 242.1, 243.01, 245.2; 422/4, 5, 62,
 105, 108–111, 168, 170, 172, 106; 210/96.1,
 198.1, 600, 739–740, 743, 614, 621, 709,
 746, 180; 95/1, 5, 8, 9, 13, 149, 163

[56] References Cited

U.S. PATENT DOCUMENTS

| | | | |
|---|---|---|---|
| 4,164,547 | 8/1979 | Simko | 423/244.01 |
| 4,307,067 | 12/1981 | Tagawa et al. | 423/224 |
| 4,733,798 | 3/1988 | Brady et al. | 222/23 |
| 4,964,185 | 10/1990 | Lehn | 8/158 |
| 5,154,734 | 10/1992 | Yung | 95/8 |
| 5,168,065 | 12/1992 | Jankura et al. | 436/55 |
| 5,246,594 | 9/1993 | Stegemann et al. | 210/743 |
| 5,266,285 | 11/1993 | Glancy et al. | 423/243.09 |
| 5,340,468 | 8/1994 | Hawthorne et al. | 210/96.1 |
| 5,382,331 | 1/1995 | Banks | 205/781 |

OTHER PUBLICATIONS

Second Progress Report: Lime/Limestone Wet–Scrubbing Test Results at the EPA Alkali Scrubbing Test Facility May 1975 PB258804 EPA –625/2–74–004.

Air Pollution Engineering Manual, Copyright 1992 by Anthony J. Buonicore and Wayne T. Davis pp.78–88.

Wet Scrubber System Study: Scrubber Handbook Jul./1972 PB–213016, by Seymour Calvert, Jhuda Goldshimd, David Leith, Dilip Mehta (NTIS).

*Primary Examiner*—Emanuel T. Voeltz
*Assistant Examiner*—Tuan Q. Dam
*Attorney, Agent, or Firm*—David Barron; Jules Jay Morris; Terrence Martin

[57] ABSTRACT

A wet scrubber control system is configured with a pH sensor and a conductivity sensor in the return solution, and with a conductivity sensor in the feed solution. Concentration of the scrubbing agent within the feed solution is determined using the conductivity of the feed solution, corrected by subtracting a bias therefrom. The bias is established by first measuring the concentration of scrubbing agent in the return solution using the pH sensor. An expected conductivity of the return solution is then looked-up. The bias is set as the difference between the expected conductivity of the return solution and a measured conductivity of the return solution.

20 Claims, 9 Drawing Sheets

SCRUBBER CONTROL SYSTEM AND METHOD

Technical Field

The present invention relates, in general, to air stream scrubber control systems. In particularly, the present invention relates to a method and system for accurately determining and controlling scrubbing agent concentration in a continuous wet scrubber system.

BACKGROUND OF THE INVENTION

Wet scrubbers have been used for many years to remove undesirable contaminates from air streams. As is well known, conventional wet scrubber systems pass a contaminated air stream through a scrubbing chamber, where the air stream encounters a mist of scrubbing solution. A scrubbing agent (which may include multiple reactants) within the scrubbing solution reacts with the contaminate(s) in the air stream, neutralizing it, such that contaminate free air is passed to the atmosphere or, for example, the next stage of processing. By way of reference, conventional wet scrubber systems and control thereof are described in, for example, "Air Pollution Engineering Manual," U.S. Environmental Protection Agency, second edition, AP-40, 1973; "Wet Scrubber System Study: Volume I—Scrubber Handbook," U.S. Environmental Protection Agency, EPA-R2-72-118A, PB 213016, August 1972; and "Lime/Limestone Wet-Scrubbing Test Results at the EPA Alkali Scrubbing Test Facility," U.S. Environmental Protection Agency, EPA-625/2-75-008, 1975.

Figure 1:
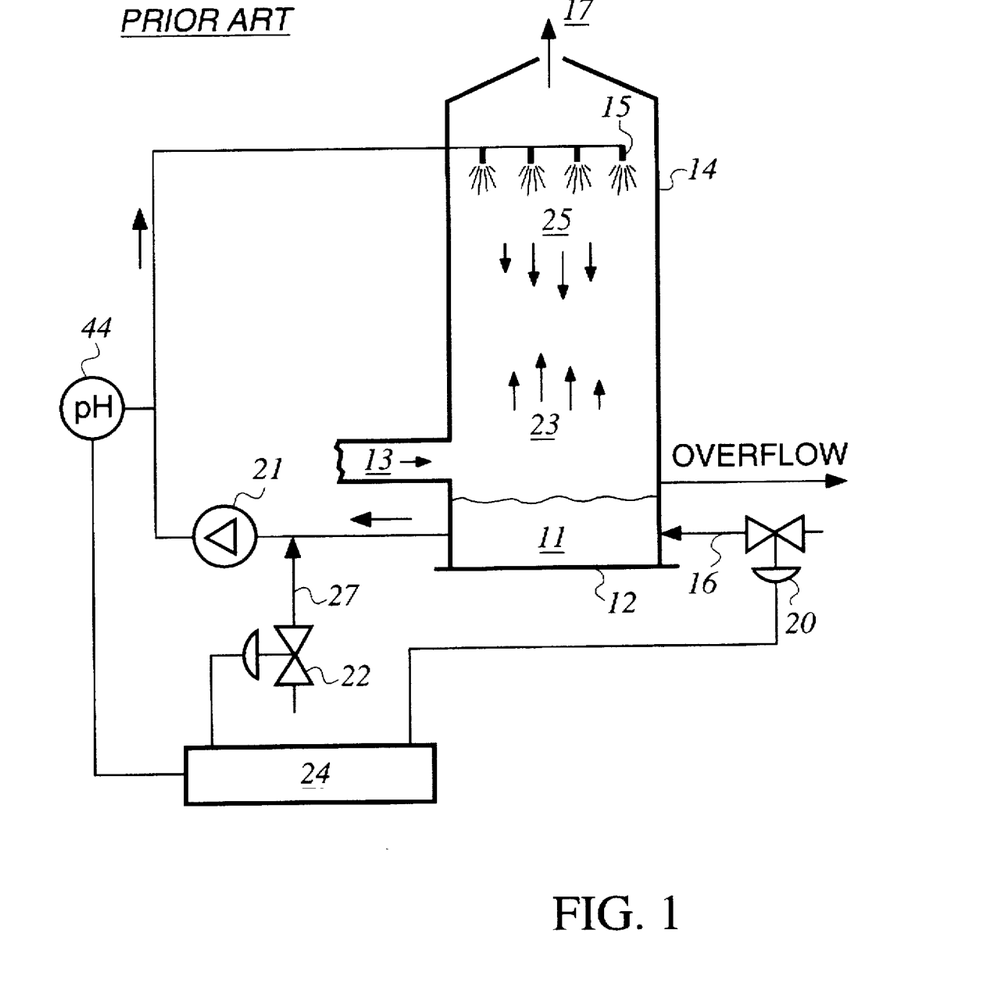
FIG. 1 depicts a conventional continuous wet scrubber system and is labeled prior art.

FIG. 1 depicts a conventional continuous wet scrubber system. A sump 12 functions as a reservoir for a scrubbing solution 11 that contains, for example, a mixture of water, residual salts and residual scrubbing agent 27. Dilution water 16 is added to scrubbing solution 11 as needed, and such addition is controlled by a valve 20 and a control system 24. Piping carries scrubbing solution 11 from sump 12 to a pump 21. Pump 21 facilitates the blending of scrubbing agent 27 (for example, a concentrated caustic) with recirculated scrubbing solution 11. The amount of scrubbing agent 27 mixed with scrubbing solution 11 is controlled by a valve 22 in connection with control system 24. Control system 24 reduces the amount of scrubbing agent 27 to be blended when the concentration thereof rises above a threshold, and contrarily increases the blended amount when scrubbing agent 27 concentration falls below a threshold.

As used herein, the term "return solution" refers to scrubbing solution 11 as it exists in sump 12 and prior to the addition of further scrubbing agent 27 to scrubbing solution 11. Further, as used herein, the term "feed solution" refers to scrubbing solution 11 after the addition of further scrubbing agent 27 (i.e., prior to spraying from dispersers 15 (e.g., nozzles)).

Scrubbing solution 11 is pumped to the top of scrubbing chamber 14, where a mist (e.g., rain) 25 of scrubbing solution 11 is produced by dispersers 15. As mist 25 descends, it encounters a mixture of air and contaminates; 23 as they rise through scrubbing chamber 14. Scrubbing agent 27 within mist 25 reacts with, and neutralizes one or more contaminates 23, leaving mostly water and reaction by-products to return into scrubbing solution 11 within sump 12. By way of example, contaminates 23 could include HCl, while scrubbing agent 27 could include NaOH.

One important goal of any continuous wet scrubber is to maintain a sufficient concentration of scrubbing agent 27 in the feed solution. A scrubbing agent concentration that is too low will result in incomplete "scrubbing" causing potentially hazardous matter to escape into the atmosphere. A scrubbing agent concentration that is too high is costly and wasteful in terms of scrubbing agent usage. Unfortunately, prior techniques for determining, and thereby controlling, scrubbing agent concentration have been deficient.

For example, one prior technique for on-line (i.e., continuous) determination of scrubbing agent concentration includes the use of a "pH" sensor 44 in the path of the feed solution. If, for example, NaOH is used as scrubbing agent 27, a pH measurement will directly correspond to the NaOH concentration in scrubbing solution 11. However, limitations of pH sensors constrain the accuracy of this pH-based concentration measurement. Further, the pH sensors themselves are eroded by the high caustic environment.

Figure 2:
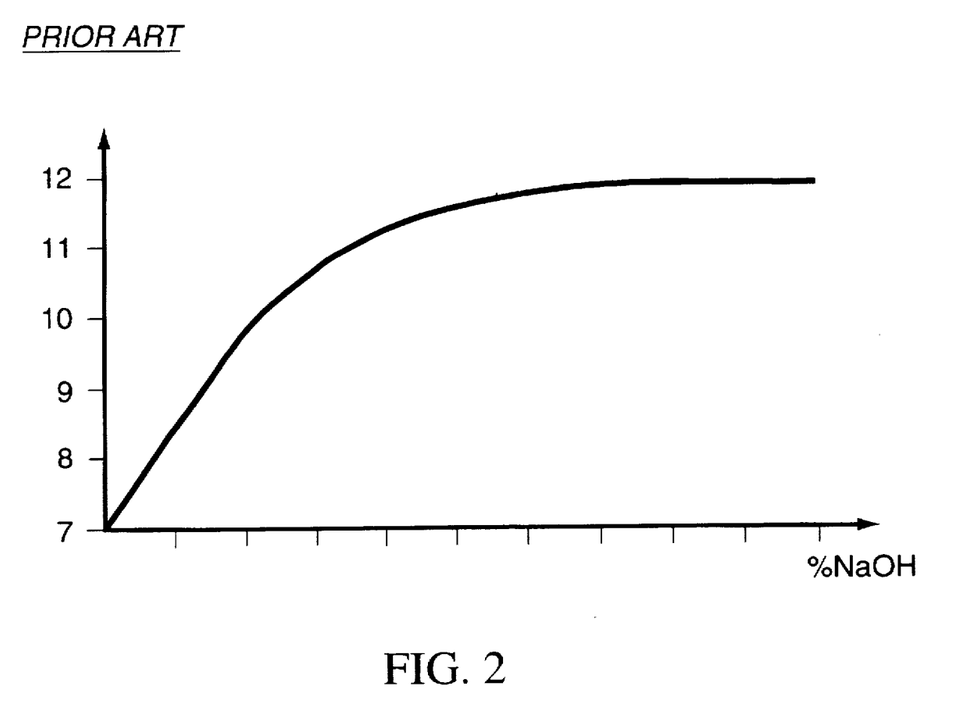
FIG. 2 is an example graph of pH versus NaOH concentration and is labeled prior art.

Referring to FIG. 2 in connection with FIG. 1, because pH sensor 44 is located in the feed solution, measured pH values will usually be high (for example, pH 10-13). In this region of values, due to the logarithmic behavior of pH sensors (e.g., glass electrode sensors), a small pH change corresponds to a large change in percentage NaOH concentration. Unfortunately, measurements from pH sensors are not very accurate, precise or repeatable in this pH range, and thus, NaOH concentration is not accurately determinable. Control of scrubbing agent concentration is therefore difficult.

The present invention is directed toward solutions to the above-noted problems.

Disclosure of the Invention

In a first aspect, the present invention includes a method for controlling addition of a scrubbing agent to a return solution in a wet scrubbing system. The method includes measuring a feed solution conductivity in the wet scrubbing system, and determining a conductivity bias corresponding to the feed solution conductivity. The addition of the scrubbing agent to the return solution is regulated as a function of the feed solution conductivity and the conductivity bias.

As an enhancement, the determining may include measuring a pH value of the return solution. An expected conductivity for the return solution may be determined as a function of the pH value, and the conductivity bias established as a difference between the expected conductivity and a measured return solution conductivity. Further, the conductivity bias may include two components, a first bias corresponding to inherent conductivity of makeup water used in the wet scrubbing system, and a second bias corresponding to conductivity of conductive contaminates accumulated during scrubbing. The second bias may be recalculated when the pH value is in a predetermined range, for example, pH 8.5 to 9.5.

As a further enhancement, the method may include measuring a return solution conductivity. An amount of scrubbing agent added may be determined as a function of a difference between the feed solution conductivity and the return solution conductivity.

As yet another enhancement, the regulating may include operating a feed forward control loop as a function of the feed solution conductivity and the conductivity bias.

In another aspect, the present invention includes a method for automatically determining a feed solution concentration of a scrubbing agent in a wet scrubbing system. The method includes measuring a feed solution conductivity of the scrubbing solution, and determining a conductivity bias corresponding to the feed solution conductivity. The feed solution concentration is determined as a function of the feed solution conductivity and the conductivity bias. The present invention also includes a computer program product configured to affect the above method.

As an enhancement, the method may include subtracting the conductivity bias from the feed solution conductivity to produce a corrected conductivity that is used in determining the feed solution concentration. The corrected conductivity may be looked-up in a conductivity-concentration table to determine the feed solution concentration.

As another enhancement, the method may include measuring a pH of a return solution in the wet scrubbing system, and looking up a return solution concentration in a pH-concentration table. The return solution concentration may be looked-up in a conductivity-concentration table to determine an expected conductivity. Moreover, a return solution conductivity may be measured, and the expected conductivity may be subtracted from it to determine the conductivity bias. The conductivity bias may be corrected for the inherent conductivity of makeup water used in the wet scrubbing system.

In yet another aspect, the present invention comprises a wet scrubbing system including: a pH sensor coupled to a return solution within the wet scrubbing system; a first conductivity sensor coupled to a feed solution within the wet scrubbing system; and a second conductivity sensor coupled to the return solution within the wet scrubbing system. The wet scrubbing system further includes a controller coupled to the pH sensor, the first conductivity sensor and the second conductivity sensor to receive measurements therefrom. The controller is programmed to determine the concentration of a scrubbing agent in the feed solution using the measurements.

In a further aspect, the present invention includes an on-line method of determining salt concentration within a scrubbing solution of a wet scrubbing system. The method includes measuring an initial and a current conductivity of the scrubbing solution. The current conductivity is measured during operational recirculation of the scrubbing solution. The salt concentration of the scrubbing solution is determined as a function of the current conductivity minus the initial conductivity.

The present invention has several advantages and features associated with it. Using the techniques disclosed herein, enhanced precision in the determination of scrubbing agent concentration is facilitated. A more efficient and effective scrubbing process results therefrom. In particular, scrubbing agent usage is further optimized, fewer unscrubbed gasses are discharged, salt concentrations are lessened and spray nozzle clogging is reduced. The techniques disclosed herein accordingly advance the field of measurement and control in wet scrubbing systems.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which like reference numbers refer to the same elements throughout:

DETAILED DESCRIPTION OF A PREFERRED EMBODIMENT

The present invention facilitates a wet scrubber system capable of accurately measuring and controlling scrubbing agent concentration. As a result, scrubbing efficiency and scrubbing agent usage are optimized. In short, a combination of conductivity and pH sensors are used in a manner that accounts for the individual deficiencies of each. This combination enables accurate determination of scrubbing agent concentration within the recirculated scrubbing solution, thereby facilitating an improved wet scrubber system and process.

Figure 3:
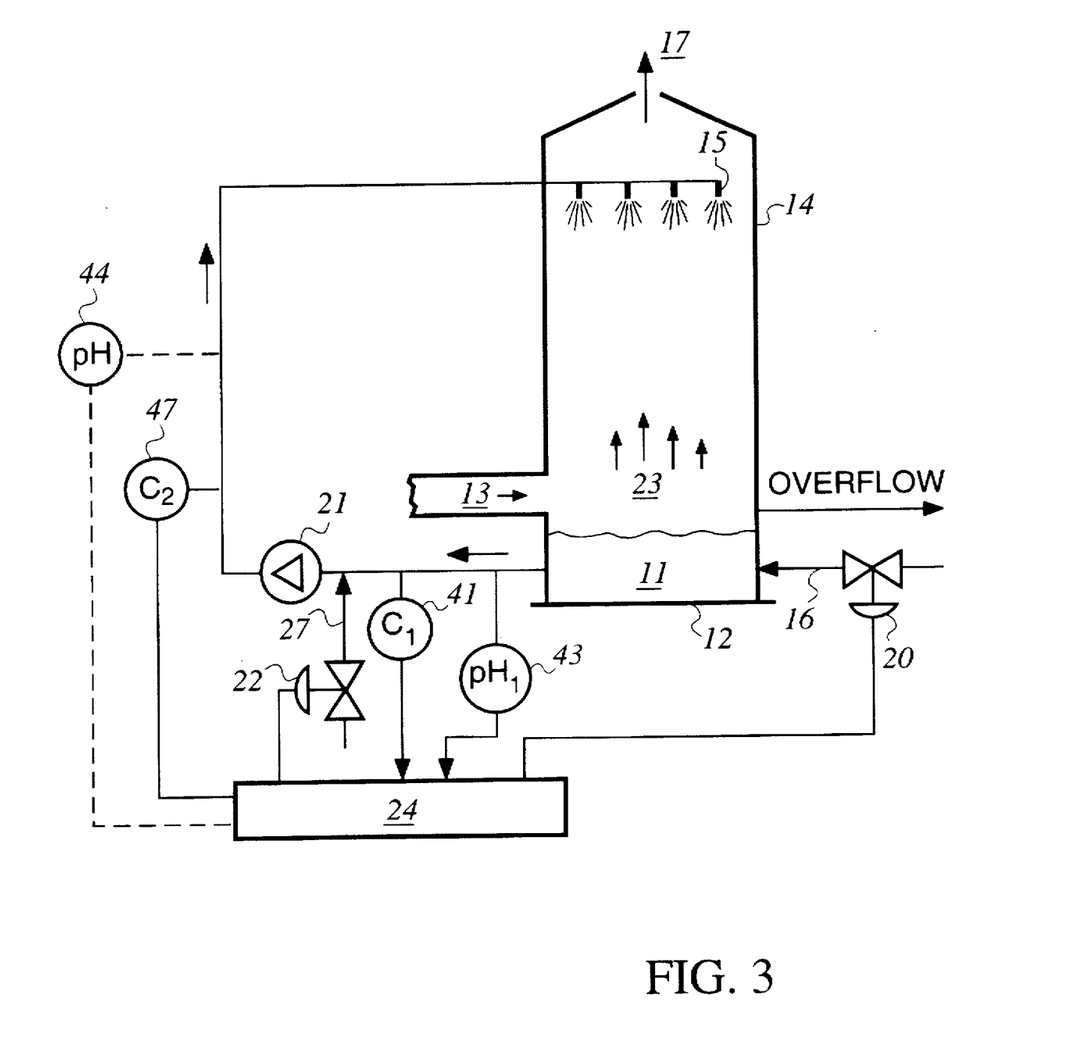
FIG. 3 depicts a continuous wet scrubber system pursuant to an embodiment of the present invention.

One embodiment of a continuous wet scrubber system pursuant to the present invention is depicted in FIG. 3. This wet scrubber system is similar to that shown in FIG. 1, however, sensor configuration, control techniques, and usage have been changed in accordance with the present invention.

In accordance with the present invention, the amount of scrubbing agent 27 (for example, NaOH) within the feed solution is determined using a pH sensor "$pH_1$" 43 and a conductivity sensor "$C_1$" 41 within the return solution, and a conductivity sensor "$C_2$" 47 within the feed solution. The amount of scrubbing agent 27 blended into the return solution is also determinable using the above-identified sensors. A further pH sensor, "pH" 44, may be included in the feed solution to satisfy governmental regulation, but is not necessary for practicing the present invention.

Figure 4:
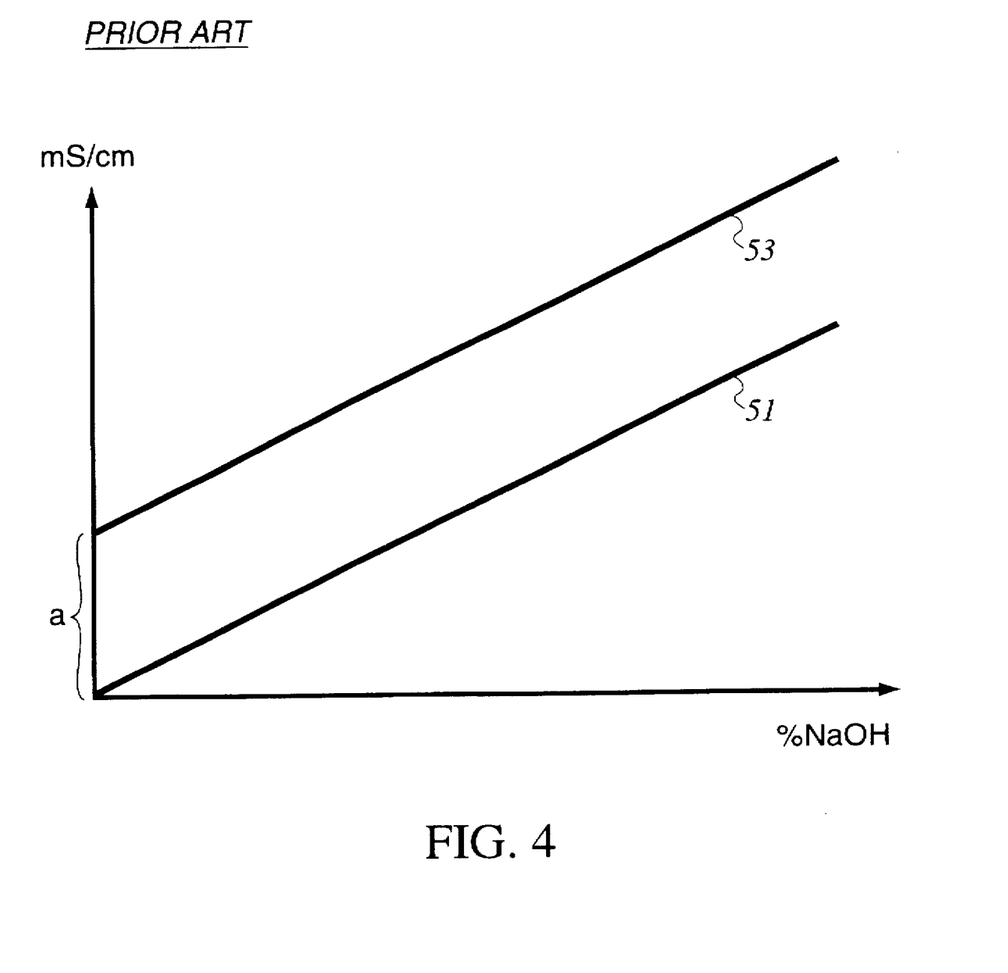
FIG. 4 is an example graph of conductivity versus NaOH concentration in accordance with the system of FIG. 3.

An example behavior of sensor $C_1$ 41, when operated in an environment wherein scrubbing agent 27 is, for example, NaOH, is depicted in the graph of FIG. 4. A relatively linear relationship (trace 51) exists between NaOH concentration within, and conductivity of, scrubbing solution 11 (conductivity is shown in milli-Siemens per centimeter). The conductivity at the origin of the graph will ordinarily be the inherent conductivity of the dilution (i.e., makeup) water used in scrubbing solution 11 (at a given reference temperature).

Because the relationship between NaOH concentration and conductivity is known, and because conductivity is a relatively linear measurement in the applicable range, NaOH concentration could be accurately determined from a conductivity measurement alone. However, this presumes that conductive contaminates (e.g., salt) are not present in scrubbing solution 11. Unfortunately, salt does accumulate during scrubbing operations.

The accumulation of, for example, salt within scrubbing solution 11 causes a bias (i.e., offset) in the conductivity-concentration relationship. This bias is shown in FIG. 4 as bias "a" between trace 51 (no accumulated salt) and a trace 53 (with accumulated salt). Despite bias "a", the relatively linear relationship between conductivity and scrubbing agent concentration is maintained. Thus, once bias "a" is determined, scrubbing agent 27 concentration can be precisely determined using conductivity.

In conformance with the present invention, sensor $pH_1$ 43 (FIG. 3) is used in connection with sensor $C_1$ 41 to determine bias "a" FIG. 4. This determination is explained below in connection with the graph of FIG. 5.

Figure 5:
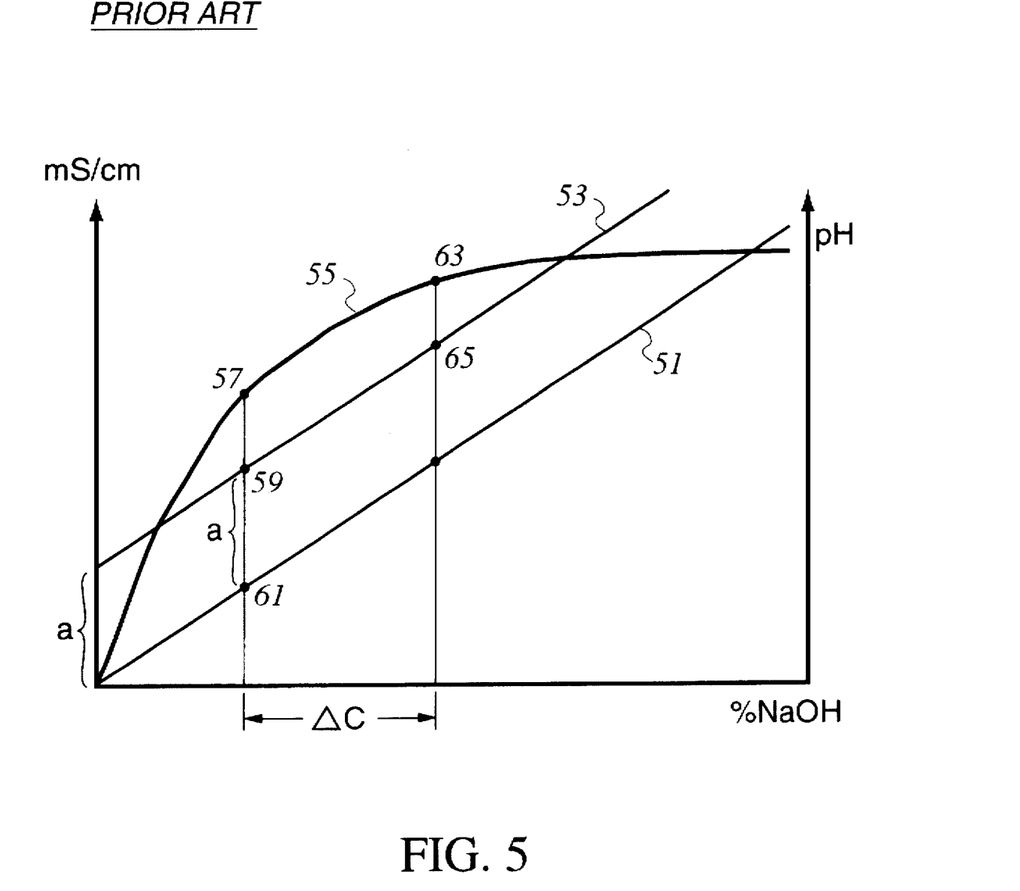
FIG. 5 is the graph of FIG. 4 having an example pH versus NaOH concentration relationship superimposed thereon pursuant to the present invention.

Sensor $pH_1$ 43 is used to measure pH concentration in the return solution. The pH levels it measures (e.g., pH 8.5–9.5) will be lower than if pH was measured in the feed solution. Advantageously, the lower pH measurements are farther from the asymptotic portion of the pH-concentration relationship, and are therefore more accurate.

The measured pH level (trace 55) is used to determine scrubbing agent concentration in the return solution (point 57—FIG. 5). This concentration also corresponds to an expected conductivity value for a scrubbing solution with no salts (point 61). However, because salts have accumulated, the conductivity of the return solution measured by sensor $C_1$ 41 will likely be higher than expected (point 59). The difference between the expected conductivity and the measured conductivity is bias "a".

During operations, bias "a" is subtracted from the measured conductivity of the feed solution and return solution and concentration is determined from the resulting conductivity value (i.e., a "corrected conductivity"). To further explain, sensor $C_2$ 47 is used to provide a conductivity measurement of the feed solution. Bias "a" is subtracted from the measured conductivity, and the resulting conductivity value is used to determine the concentration of scrubbing agent 27 in the feed solution. Advantageously, this reading is accurate, despite the high pH levels that rendered conventional pH sensors situated within the feed solution inaccurate. Return solution concentration is similarly determined using sensor $C_1$ 41.

Bias "a" is established on a periodic basis and may vary with the specific scrubbing process. As one example, bias "a" is recalculated when at least 2 hours have elapsed since the last bias calculation, and when pH is in the range of, e.g., pH 8.5–9.5.

The measurements from sensors $C_1$ 41 and $C_2$ 47 are also usable to accurately determine the amount of scrubbing agent 27 blended into recirculated scrubbing solution 11. The concentration of scrubbing agent 27 measured by sensor $C_1$ 41 (point 59) is subtracted from the concentration measured by sensor $C_2$ 47 (point 65) to determine a change in concentration, $\Delta C$ (the pH at point 63 corresponds to the concentration at point 65). This change in concentration directly corresponds to the amount of scrubbing agent 27 added to the return path solution.

Figure 6:
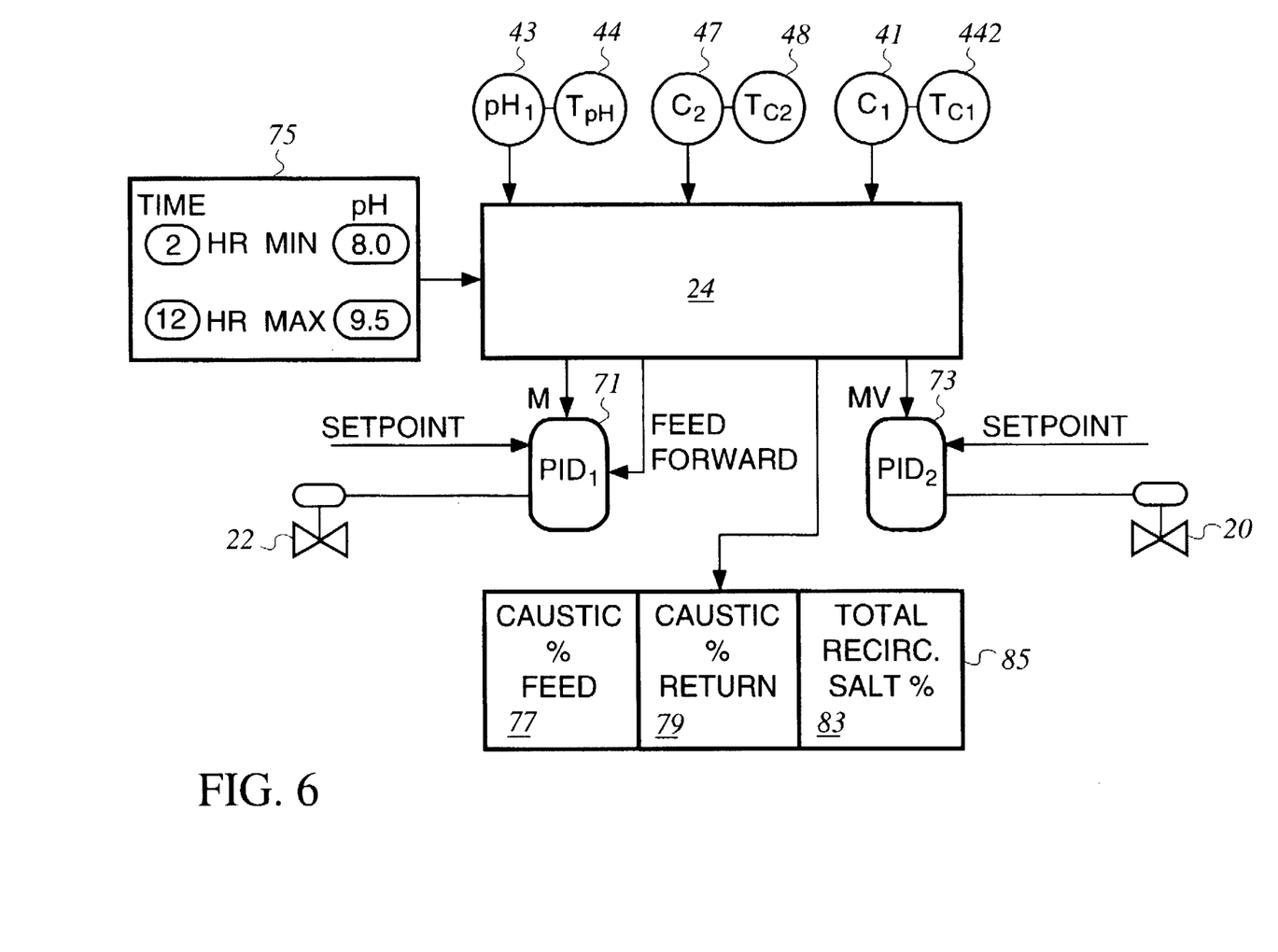
FIG. 6 is a control system diagram of the wet scrubber system of FIG. 3 in conformance with one embodiment of the present invention.

Depicted in FIG. 6 is a control system that includes the sensors and valves of the wet scrubbing system of FIG. 3. A supervisory controller 24 is responsible for integration of all sensor and control signals used in the wet scrubbing system. As an example, controller 24 may be a Model 760/740 Series or an "I/A Series" controller, both from The Foxboro Company of Foxboro, Mass. Controller 24 is programmed with the steps described herein to affect wet scrubber control in accordance with the techniques of the present invention.

Each of the depicted sensors operates in connection with integral temperature sensors that provide temperature compensation. In particular, sensor $pH_1$ 43 functions with a temperature sensor "$T_{pH}$" 44, sensor $C_2$ 47 functions with a temperature sensor "$T_{c2}$" 48, and sensor $C_1$ 41 function with a temperature sensor "$T_{c1}$" 42. Accordingly, the measurements obtained from the sensors is accurate at the elevated operating temperature of wet scrubber systems (e.g., 50–70 degrees C.).

A first PID-type controller, $PID_1$ 71, controls the concentration of scrubbing agent 27 by regulating the addition thereof. In particular, $PID_1$ 71 is coupled to valve 22 such that the flow of scrubbing agent 27 may be regulated. Feed solution concentration is communicated from controller 24 to $PID_1$ 71 for use in a feed forward control loop, while return solution concentration is passed thereto as a measurement value for a feedback control loop.

A second PID-type controller, $PID_2$ 73, controls the concentration of accumulated salts in scrubbing solution 11 by regulating the addition of dilution water thereto. In particular, $PID_2$ 73 is coupled to valve 20 such that the addition of dilution water to scrubbing solution 11 may be regulated. Salt concentration of scrubbing solution 11 is communicated from controller 24 to $PID_2$ 73 as a measurement value for use in a conventional control loop.

Measurement correlation input to controller 24 is provided by an input block 75. For example, depicted in FIG. 6 is an input block corresponding to bias recalculation parameters. A variety of input techniques may be used to implement input block 75 including, e.g., a keypad, pushbuttons, thumbwheel switches, or GUI computer interface. User output from controller 24 is directed to an output device 85. Process parameters output to output device 85 include, e.g., "caustic % feed" 77 (i.e., scrubbing agent 27 concentration in feed solution), "caustic % return" 79 (i.e., scrubbing agent 27 concentration in return solution) and "Total Recirculated Salt %" 83 (i.e., the amount of accumulated salt in scrubbing solution 11). Output device 85 may be implemented in a variety of ways, and may include., e.g., a CRT, LED, LCD, analog panel meter display or printer.

Figure 7A:
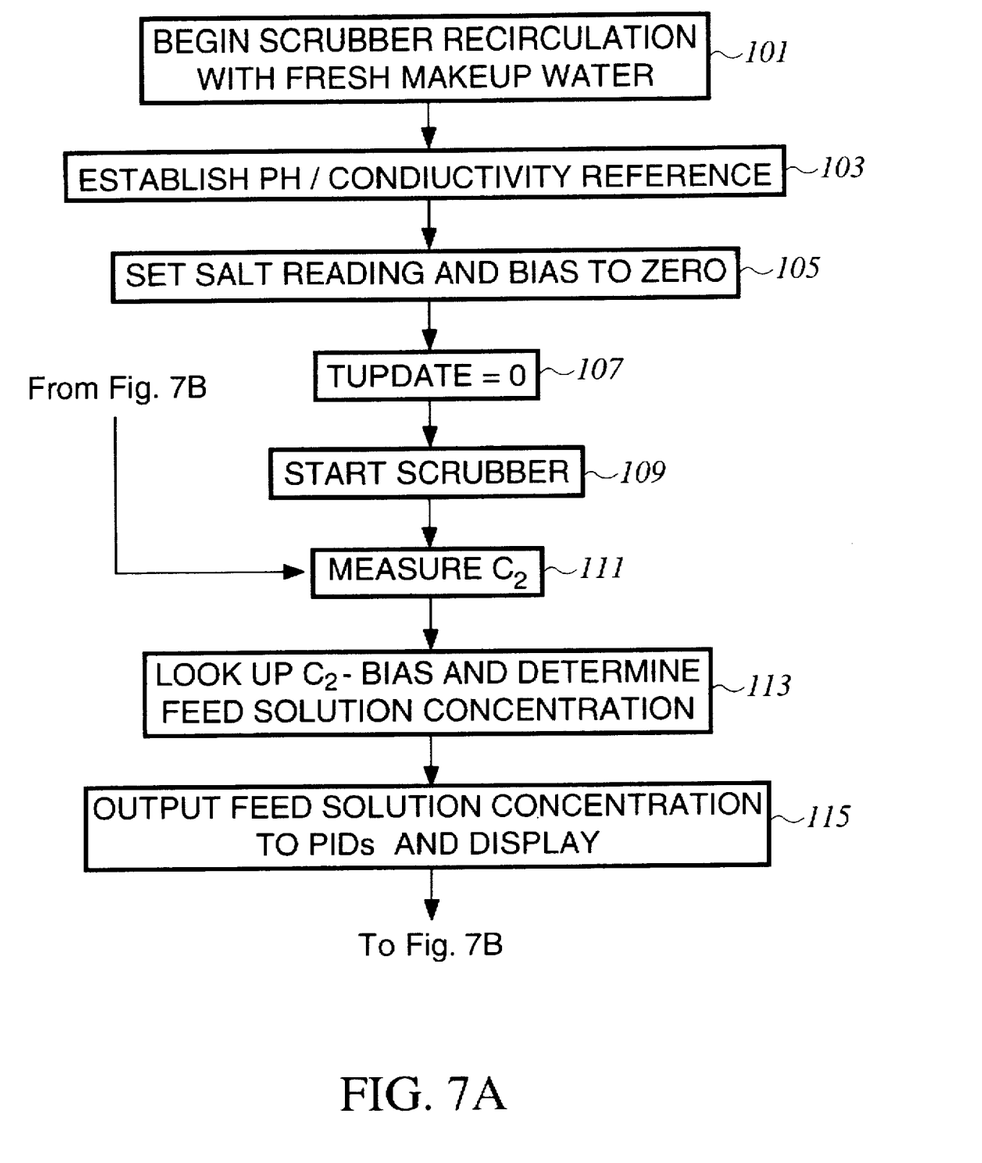
FIGS. 7A–7B depict a flow-diagram of a method for operating a wet scrubbing system pursuant to an embodiment of the present invention.
Figure 7B:
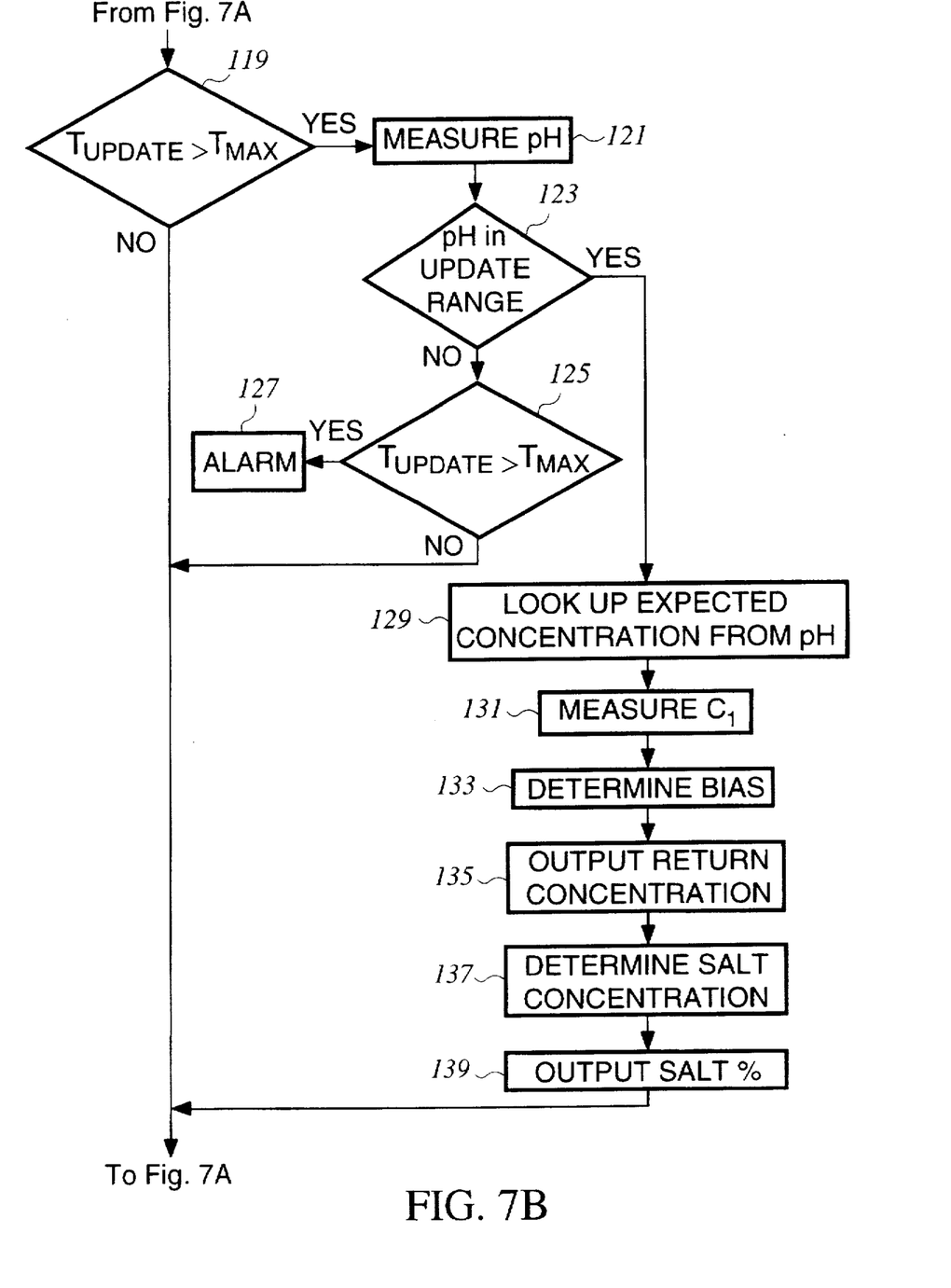

Shown in FIGS. 7A–7B is a flow-diagram of steps used in controlling a wet scrubber system pursuant to an embodiment of the present invention. To begin, the scrubber is initialized by filling the system with fresh makeup water (STEP 101). Measurements are taken using the pH and conductivity sensors to establish a baseline (STEP 103). The inherent conductivity of the makeup water used is thereby determined. This conductivity is stored as an initial bias, "$bias_0$", from the conductivity of absolutely pure water that is used as a reference conductivity relationship. As no "scrubbing" reaction has yet taken place, a variable used to store a representation of the amount of accumulated salt in the system is also set to zero (STEP 105). Further, a bias resulting from accumulated salt, "$bias_s$" is initialized to zero. A time used to track bias updates, "$T_{UPDATE}$" is also set to zero (STEP 107).

A main loop is next entered, and the conductivity of the feed solution is measured by sensor $C_2$ (STEP 111). Both $bias_0$ and $bias_s$ are subtracted from the measured conductivity, and the resultant "corrected" conductivity (STEP 113) is used to look up the concentration of scrubbing agent in the appropriate table (i.e., programmed into the controller). The concentration is output into the PIDs, and is optionally displayed (STEP 115).

To continue, a test is performed to determine if the accumulated time since $bias_s$ was last calculated, $T_{UPDATE}$, has exceeded a minimum time limit on bias updates, $T_{MIN}$ (INQUIRY 119). If not, the main loop iterates and continues at STEP 111.

If $T_{MIN}$ has been exceeded, a test is performed to determine if the return solution is within a predetermined pH range for the redetermination of bias$_s$. (INQUIRY 123). The pH range should correspond to an accurate range of the pH sensor used, and may be, for example, pH 8.5–9.5. If the pH is not within the predetermined range, a test is performed to determine if $T_{UPDATE}$ has exceeded a maximum, $T_{MAX}$ (INQUIRY 125). If $T_{MAX}$ has been exceeded, an alarm is activated to indicate that potential problems may exist with the return solution pH level (STEP 127). If $T_{MAX}$ has not been exceeded, the main loop iterates at STEP 111.

If the return solution pH is in the predetermined range for bias updating (INQUIRY 123), an expected conductivity corresponding to the measured pH level is looked-up. Specifically, the scrubbing agent concentration corresponding to the measured pH level is first looked-up in the appropriate tables (STEP 129). Then, using the looked-up concentration, the expected conductivity is looked-up. The baseline bias, bias$_0$, that accounts for water impurities is added to the expected conductivity, and the resulting value is subtracted from a measured return solution conductivity (STEP 131). The resultant difference is stored as bias$_s$, i.e., the bias resulting from salt accumulation during the scrubbing process (STEP 133). Further, the scrubbing agent concentration in the return solution is optionally output (STEP 135).

The determined bias$_s$ is next used to determine the salt concentration that has accumulated within the scrubbing solution (STEP 137). Bias$_s$ is a direct indication of the change in conductivity of scrubbing solution 11 resulting from accumulated salt. Accordingly, bias$_s$ is looked-up in conventional salinity tables for the appropriate salt and percentage salt concentration is determined. The salt concentration is then optionally output (STEP 139), and the loop iterates.

The indication of an elevated salt concentration can be used to affect an addition of more dilution water into the scrubbing solution. Thus, in accordance with the techniques disclosed herein, the problems associated with an elevated salt concentration in the scrubbing solution can be minimized by a careful control thereof.

To summarize, the present invention has several advantages and features associated with it. Using the techniques disclosed herein, enhanced precision in the determination of scrubbing agent concentration is facilitated. A more efficient and effective scrubbing process results therefrom. In particular, scrubbing agent usage is further optimized, fewer unscrubbed gasses are discharged, salt concentrations are lessened and spray nozzle clogging is reduced. The techniques disclosed herein accordingly advance the field of measurement and control in wet scrubbing systems. Therefore, the techniques disclosed herein advance the field of measurement and control in wet scrubbing systems.

Figure 8:
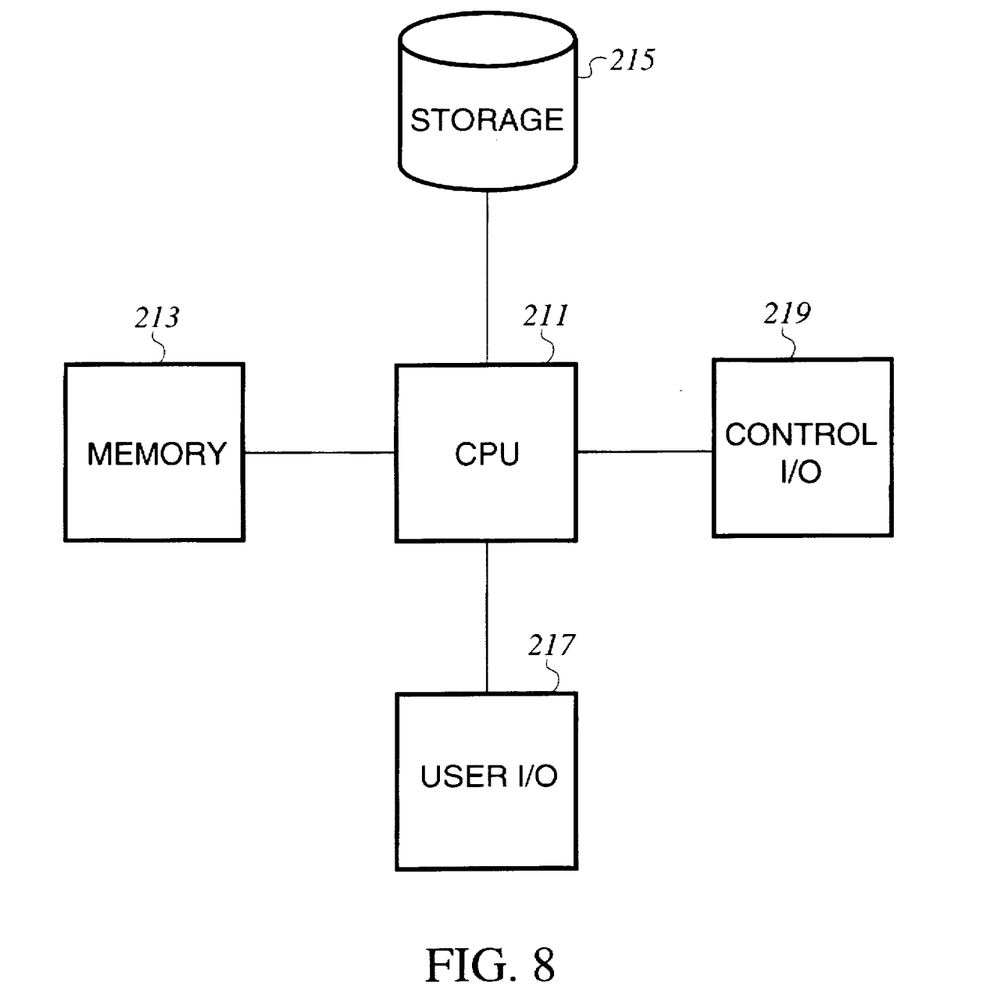
FIG. 8 is a block diagram of a computer system used in implementing the principles of the present invention.

By way of reference, controllers such as, e.g., the "I/A Series" controller from The Foxboro Company include components common to computer systems. For example, the hardware elements of a controller used to implement the techniques of the present invention are shown in FIG. 8. A central processing unit ("CPU") 211 provides main processing functionality. A memory 213 is coupled to CPU 211 for providing operational storage of programs and data. Memory 213 may comprise, for example, random access memory ("RAM") and/or read only memory ("ROM"). Non-volatile storage of, for example, data files and programs is provided by a storage 215 that may comprise, for example, disk storage. Both memory 213 and storage 215 comprise computer usable medium that may store computer program products in the form of computer readable program code.

User input and output are provided by an input/output ("I/O") facility 217. I/O facility 217 may include, for example, a graphical display, a mouse and/or a graphics tablet. Control I/O is provided by control I/O facility 219.

Described above are examples of techniques for use within wet scrubbing systems. It will be apparent to those of ordinary skill in the art that the abovedescribed flows and sequences of steps are only examples. There can be many variations to the above, including, for instance, processing more or less than the steps described above, modifying one or more of the steps, or changing the order of some steps without departing from the true spirit and scope of the present invention. These variations are, therefore, considered a part of the claimed invention.

The concentration, conductivity and pH tables referred to hereinabove are available from several industry resources. As examples, reference is made herein to "The International Critical Tables," Volume VI, 1929, and "Theory and Application of Electrolytic Conductivity Measurement," The Foxboro Company, TI 612112, 1982.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

I claim:

1. A method of controlling addition of a scrubbing agent to a return solution in a wet scrubbing system, said method comprising:
   (a) measuring a feed solution conductivity in said wet scrubbing system;
   (b) determining a conductivity bias corresponding to said feed solution conductivity; and
   (c) regulating said addition of said scrubbing agent to said return solution as a function of said feed solution conductivity and said conductivity bias.

2. The method of claim 1, wherein said determining includes measuring a pH value of said return solution.

3. The method of claim 2, wherein said determining further includes determining an expected conductivity for said return solution as a function of said pH value, said conductivity bias comprising a difference between said expected conductivity and a measured return solution conductivity.

4. The method of claim 3, wherein said determining further includes determining two components of said conductivity bias, said two components including a first bias corresponding to inherent conductivity of makeup water used in said wet scrubbing system, and a second bias corresponding to conductivity of conductive contaminates accumulated during scrubbing.

5. The method of claim 4, wherein said second bias is recalculated when said pH value is in a predetermined range.

6. The method of claim 5, wherein said predetermined range is 8.5 to 9.5.

7. The method of claim 1, wherein said method further comprising measuring a return solution conductivity.

8. The method of claim 7, further comprising determining an amount of scrubbing agent added during said addition of said scrubbing agent as a function of a difference between said feed solution conductivity and said return solution conductivity.

9. The method of claim 1, wherein said regulating comprises subtracting said conductivity bias from said feed solution conductivity to determine a corrected conductivity and regulating said addition of said scrubbing agent as a function of said corrected conductivity.

10. The method of claim 1, wherein said regulating comprises operating a feed forward control loop as a function of said feed solution conductivity and said conductivity bias.

11. A method of automatically determining a feed solution concentration of a scrubbing agent in a wet scrubbing system, said method comprising:

(a) measuring a feed solution conductivity of said scrubbing solution;

(b) determining a conductivity bias corresponding to said feed solution conductivity; and (c) determining said feed solution concentration of said scrubbing agent as a function of said feed solution conductivity and said conductivity bias.

12. The method of claim 11, wherein said determining (c) includes subtracting said conductivity bias from said feed solution conductivity to produce a corrected conductivity that is used in determining said feed solution concentration.

13. The method of claim 12, wherein said determining (c) further includes looking-up said corrected conductivity in a conductivity-concentration table corresponding to said scrubbing agent.

14. The method of claim 11, wherein said determining (b) includes measuring a pH of a return solution in said wet scrubbing system, and looking up said pH in a pH-concentration table to determine a return solution concentration.

15. The method of claim 14, wherein said determining (b) further includes looking up said return solution concentration in a conductivity-concentration table to determine an expected conductivity.

16. The method of claim 15, wherein said determining (b) further includes measuring a return solution conductivity, and subtracting said expected conductivity from said return solution conductivity to determine said conductivity bias.

17. The method of claim 16, further including correcting said conductivity bias for inherent conductivity of makeup water used in said wet scrubbing system.

18. A computer program product comprising a computer usable medium having computer readable program code means therein for use in automatically determining a feed solution concentration of a scrubbing agent in a wet scrubbing system, said computer readable program code means in said computer program product comprising:

first computer readable program code means for causing a computer to affect measuring a feed solution conductivity of said scrubbing solution;

second computer readable program code means for causing a computer to affect determining a conductivity bias corresponding to said feed solution conductivity; and third computer readable program code means for causing a computer to affect determining said feed solution concentration of said scrubbing agent as a function of said feed solution conductivity and said conductivity bias.

19. A wet scrubbing system comprising:

a pH sensor coupled to a return solution within said wet scrubbing system;

a first conductivity sensor coupled to a feed solution within said wet scrubbing system;

a second conductivity sensor coupled to said return solution within said wet scrubbing system; and a controller coupled to said pH sensor, said first conductivity sensor and said second conductivity sensor to receive measurements therefrom, said controller programmed to determine a concentration of a scrubbing agent within said feed solution using said measurements.

20. An on-line method of determining salt concentration within a scrubbing solution of a wet scrubbing system, said method comprising:

(a) measuring an initial conductivity of said scrubbing solution;

(b) measuring a current conductivity of said scrubbing solution during operational recirculation of said scrubbing solution; and (c) determining said salt concentration as a function of said current conductivity minus said initial conductivity.

* * * * *